United States Patent
Jette et al.

(10) Patent No.: US 9,296,053 B2
(45) Date of Patent: Mar. 29, 2016

(54) APPARATUS FOR PROVIDING FIRTREE SLOTS

(71) Applicant: Pratt & Whitney Canada Corp., Longueuil (CA)

(72) Inventors: Sylvian Jette, Boucherville (CA); Yannick Dupont, Montreal (CA); Amr Elfizy, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 14/045,850

(22) Filed: Oct. 4, 2013

(65) Prior Publication Data

US 2014/0037396 A1 Feb. 6, 2014

Related U.S. Application Data

(62) Division of application No. 12/501,099, filed on Jul. 10, 2009, now Pat. No. 8,567,059.

(51) Int. Cl.
| | |
|---|---|
| *B23C 3/36* | (2006.01) |
| *B24B 19/02* | (2006.01) |
| *B24D 7/18* | (2006.01) |
| *F01D 5/30* | (2006.01) |

(52) U.S. Cl.
CPC . *B23C 3/36* (2013.01); *B24B 19/02* (2013.01); *B24D 7/18* (2013.01); *F01D 5/3007* (2013.01); *B23C 2220/366* (2013.01); *F05D 2230/10* (2013.01); *Y10T 29/4932* (2015.01); *Y10T 29/49316* (2015.01); *Y10T 29/49995* (2015.01); *Y10T 29/49996* (2015.01); *Y10T 408/905* (2015.01); *Y10T 409/303752* (2015.01); *Y10T 409/303808* (2015.01); *Y10T 409/304424* (2015.01)

(58) Field of Classification Search
CPC ..... B24B 19/009; B24B 19/02; B23P 15/006; F01D 9/042; B23F 21/14; B23F 21/10; B23F 21/122; B23B 27/145; B23B 27/14; C23C 30/005; Y10T 29/4932; Y10T 29/49323; Y10T 29/49325; Y10T 29/49995; Y10T 29/49996
USPC ......... 29/892, 892.2, 892.22, 892.23; 451/11, 451/541, 547, 147; 409/131, 132, 143; 407/119, 29, 28, 29.13, 64
See application file for complete search history.

(56) References Cited

U.S. PATENT DOCUMENTS

| | | |
|---|---|---|
| 1,614,558 A | 1/1927 | Kasley |
| 2,660,779 A | 12/1953 | Atkinson |
| 2,962,941 A | 12/1960 | Stein et al. |
| 3,045,968 A | 7/1962 | Willis |
| 4,914,872 A | 4/1990 | Snyder et al. |
| 5,040,337 A | 8/1991 | Spirito et al. |

(Continued)

FOREIGN PATENT DOCUMENTS

| | | | |
|---|---|---|---|
| EP | 1944109 | 7/2008 | |
| GB | 2435440 A | * 8/2007 | ............... B24D 5/00 |

*Primary Examiner* — Sarang Afzali

(74) *Attorney, Agent, or Firm* — Norton Rose Fulbright Canada LLP

(57) ABSTRACT

An apparatus for forming a firtree slot in a disc of a bladed rotor assembly for a gas turbine engine may include a tip portion having the shape of the profile of one side of the firtree slot to be formed but smaller than the profile of the complete firtree slot so that the tool will only engage one side of the firtree slot.

3 Claims, 6 Drawing Sheets

(56) References Cited

U.S. PATENT DOCUMENTS

| | | |
|---|---|---|
| 5,168,661 A | 12/1992 | Pedersen et al. |
| 5,241,794 A | 9/1993 | Pedersen et al. |
| 6,185,818 B1 | 2/2001 | Ito et al. |
| 6,238,186 B1 | 5/2001 | Sato et al. |
| 7,007,382 B2 | 3/2006 | Mantel |
| 7,029,367 B2 | 4/2006 | Bouillot et al. |
| 7,097,540 B1 | 8/2006 | Gosinski et al. |
| 7,101,263 B2 | 9/2006 | Schwartz et al. |
| 7,144,307 B2 | 12/2006 | Schwartz et al. |
| 7,303,461 B1 | 12/2007 | Campomanes et al. |
| 7,836,594 B2 | 11/2010 | Rose |
| 7,862,263 B2 | 1/2011 | van Iperen |
| 7,896,728 B2 | 3/2011 | Schwartz et al. |
| 8,014,893 B2 * | 9/2011 | Miki et al. .................. 700/176 |
| 2006/0246824 A1 * | 11/2006 | Grady et al. .................. 451/28 |
| 2009/0291622 A1 * | 11/2009 | Butler et al. .................. 451/58 |

\* cited by examiner

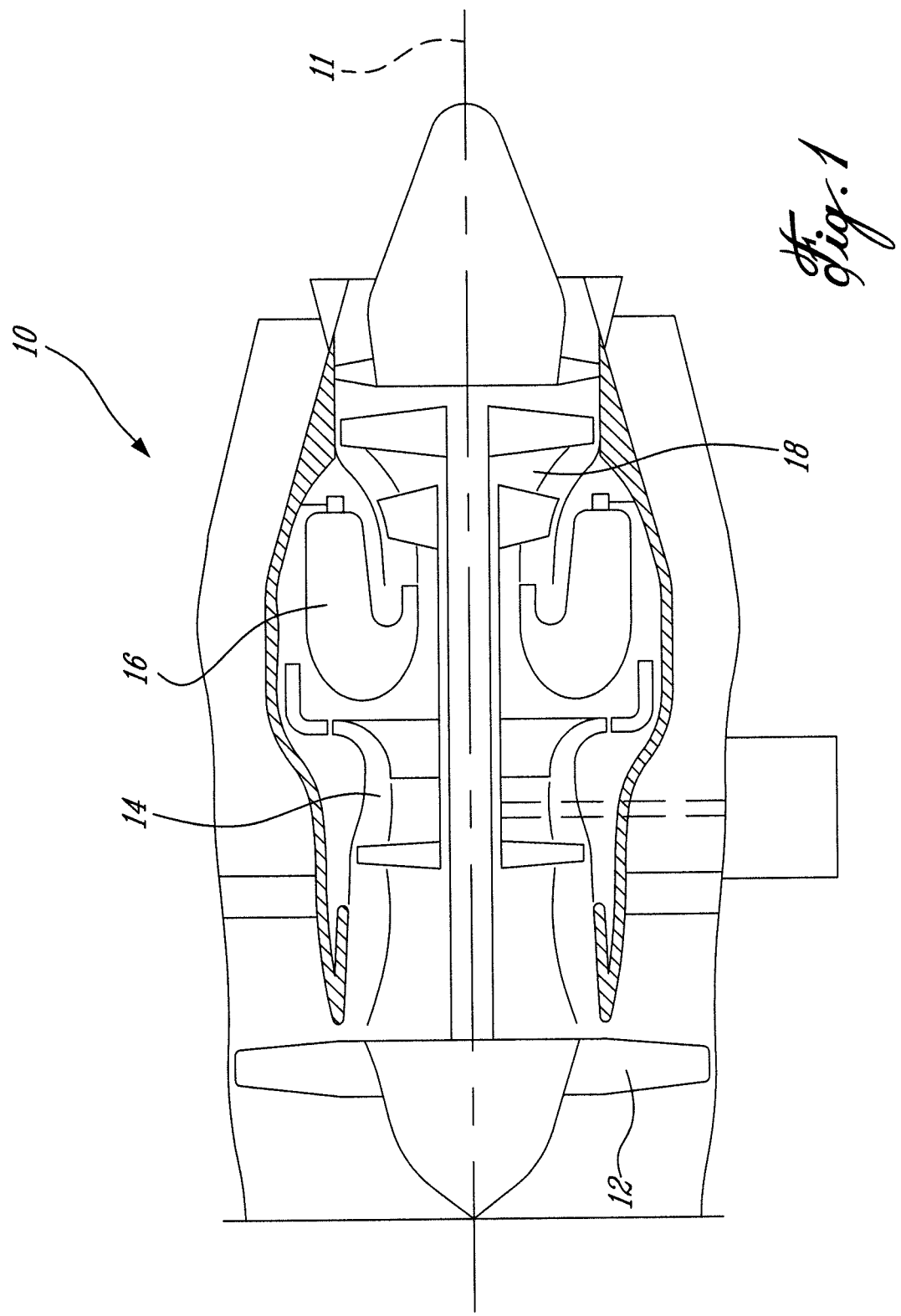

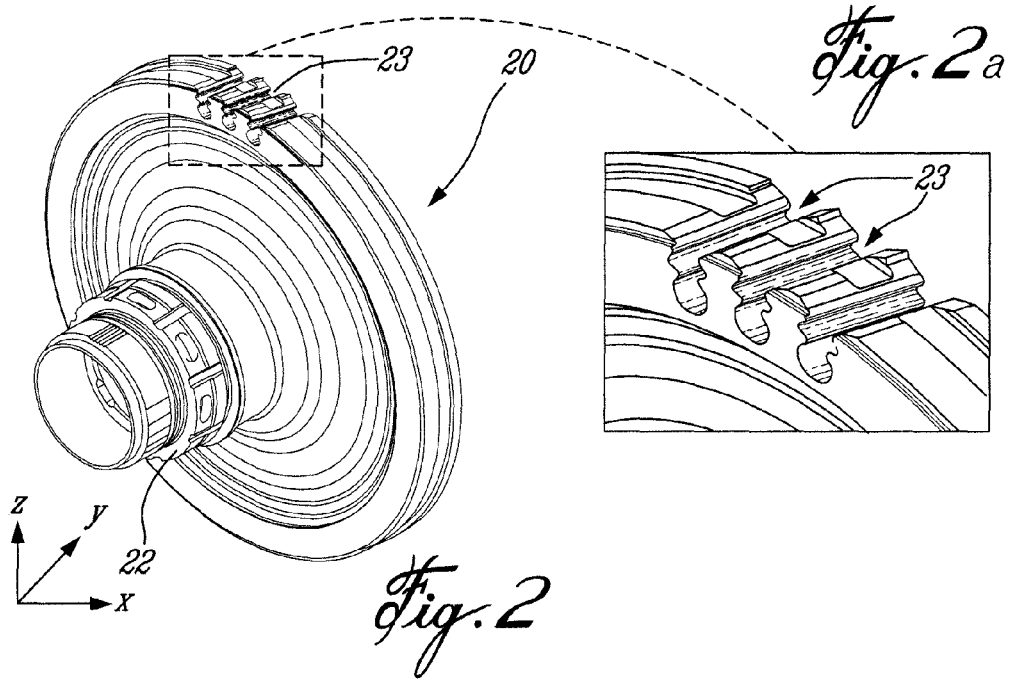
Fig. 2a
Fig. 2
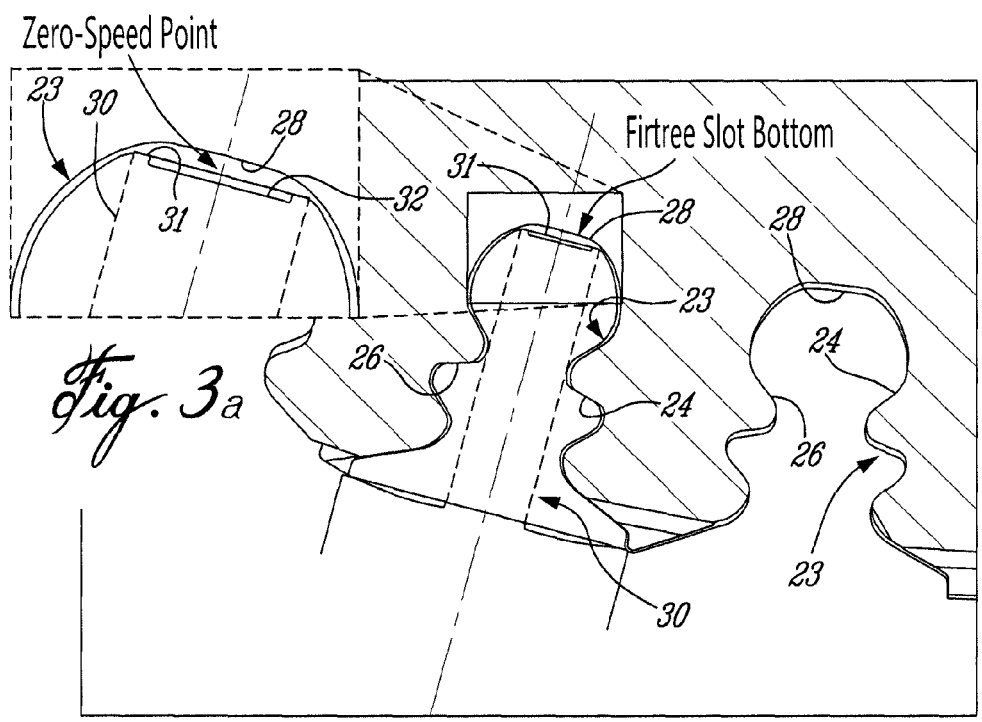
Fig. 3a
Fig. 3

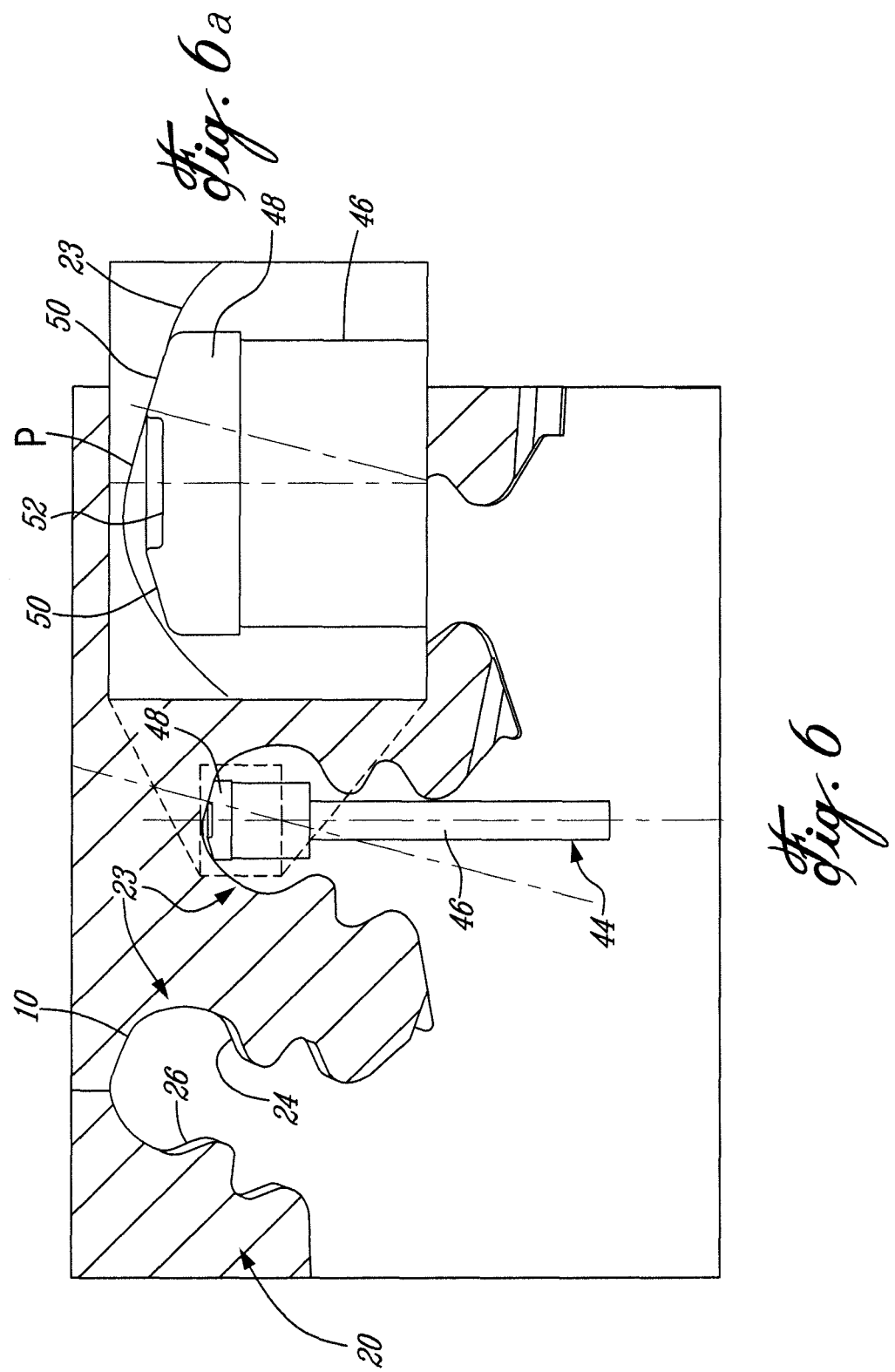

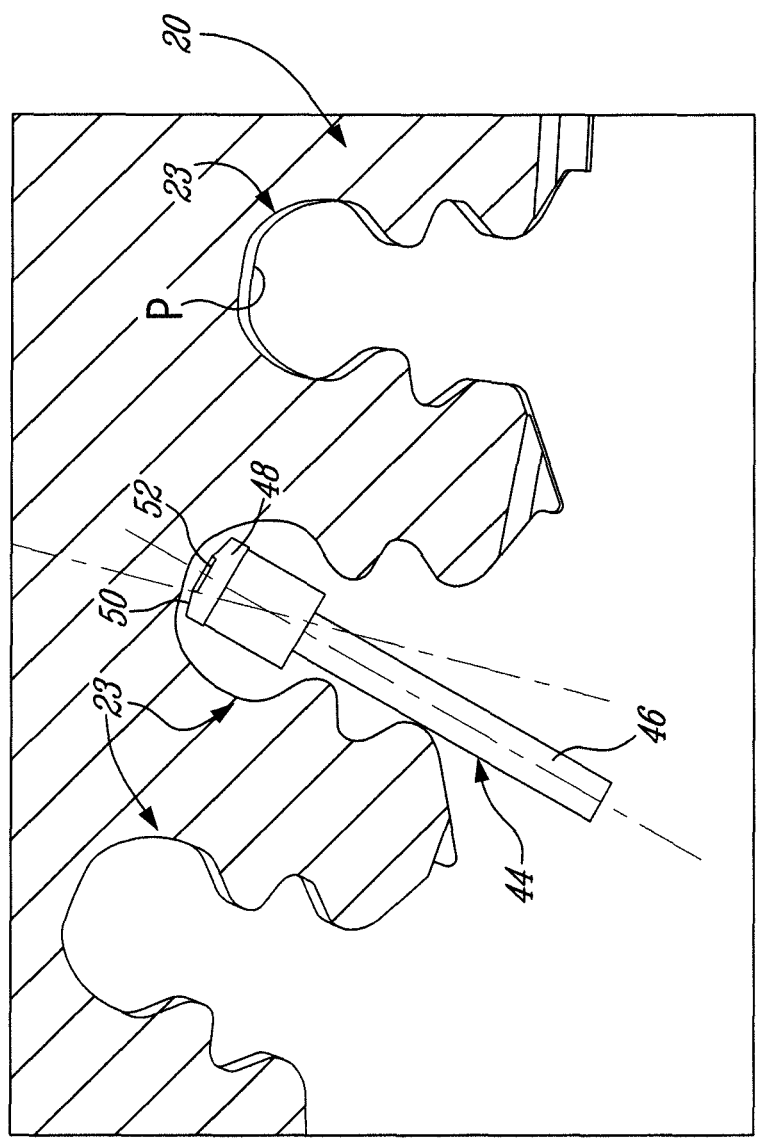

APPARATUS FOR PROVIDING FIRTREE SLOTS

CROSS-REFERENCE TO RELATED APPLICATIONS

The present application is a divisional of U.S. patent application Ser. No. 12/501,099 filed Jul. 10, 2009, now issued as U.S. Pat. No. 8,567,059, the entire content of which is incorporated herein by reference.

TECHNICAL FIELD

The application relates generally to a apparatus for providing firtree slots in the disc of a bladed disc assembly of a turbine engine and the tools used for same.

BACKGROUND

Gas turbine engines typically include machined firtree shaped blade fixing slots. The machining of such slots typically requires several operations involving several different tools. This results in increases in machining time, and can decrease accuracy. Improvement is desired.

SUMMARY

There is provided a process for forming a firtree slot in a disc of a bladed rotor assembly for a gas turbine engine, the firtree slot having first and second side wall having respective first and second finished side wall profiles, the process comprising: making a first pass with a machining quill to form a rough profile of the firtree slot; making a second pass with an inclined first finishing tool having the shape of the first finished side wall profile of the firtree slot and avoiding engagement with the second side wall; making a third pass with an inclined second finishing tool having the shape of the second finished side wall profile of the firtree slot and avoiding engagement with the first side wall, in order to provide a firtree slot for receiving and fixing the root of a blade. A rotor disc for a gas turbine engine formed by such a process is also provided.

There is also provided a tool for use in the formation of a firtree slot comprising a tip portion having the shape of the profile of one side of the firtree slot to be formed but smaller than the profile of the complete firtree slot so that the tool will only engage one side of the firtree slot and the tip including a recessed portion in the axial distal end of the tip in order to avoid a zero speed contact between the tool and the machined surface.

There is further provided a finishing tool for use in the formation of a firtree slot comprising a tip portion with a distal finishing surface transverse to the rotational axis of the tool, the distal surface having a shape sufficient to removing excess ridges formed by the overlapping of separate finishing tools in the bottom of the firtree slot and the distal surface having a recessed central portion in order to avoid a zero speed contact between the tool and the machined surface.

Further details of these and other aspects will be apparent from the detailed description and figures included below.

BRIEF DESCRIPTION OF THE DRAWINGS

Reference is now made to the accompanying figures, in which:

FIG. 1 is a schematic cross-sectional view of a turbofan gas turbine engine;

FIG. 2 is a perspective view of a disc with firtree slots partially formed in the periphery thereof;

FIG. 2A is an enlarged fragmentary perspective view of a detail shown in FIG. 2;

FIG. 3 is a schematic fragmentary view of a typical firtree slot being formed with a first tool;

FIG. 3A is a fragmentary enlarged view of a detail of FIG. 3;

FIG. 6 is an enlarged fragmentary schematic view similar to FIGS. 4 and 5 with a still further tool being utilised;

FIG. 6A is a fragmentary enlarged view of a detail shown in FIG. 6; and

FIG. 7 is a schematic enlarged fragmentary view similar to FIG. 6 with the tool in a different position.

DETAILED DESCRIPTION

Figure 4:
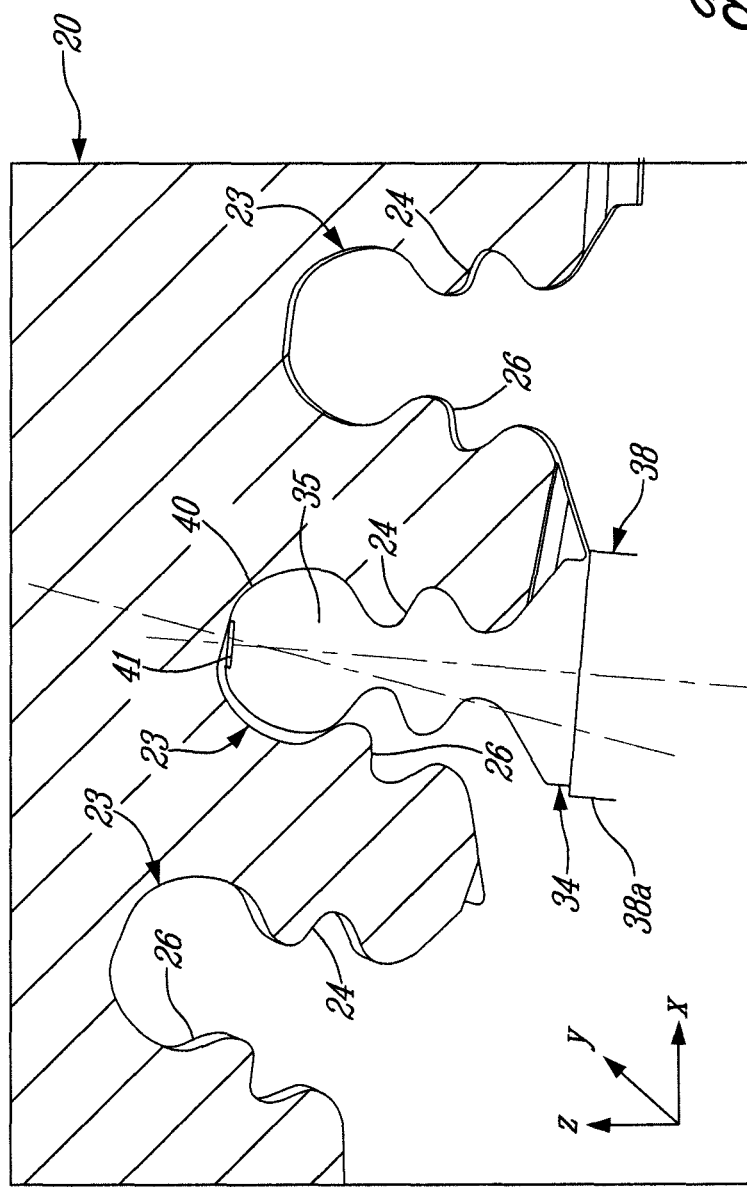
FIG. 4 is a fragmentary schematic view showing three firtree slots with a specific tool in one of the slots.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

A gas turbine engine rotor disc 20 is shown in FIG. 2. The disc 20 can be a disc for either the compressor or a turbine bladed rotor. Airfoil blades (not shown) which radially extend outwardly from the disc 20 are retained by dovetail or firtree slots 23 provided on the periphery of the disc 20. Firtree slots 23 typically include a sidewall 24 and an opposite sidewall 26 which may be asymmetric. The firtree slot 23 is generally formed by machining using broaching, EDM, side-entry milling or super-abrasive techniques. In the present embodiments, the tools are of a super-abrasive type described in U.S. Pat. No. 7,101,263 (Schwartz et al) and U.S. Pat. No. 7,144,307 (Schwartz et al), the entire contents of which are incorporated herein by reference. Any suitable tools may be used, however. The present process however uses a plurality of smaller super-abrasive quills for forming the firtree slots while reducing the occurrence of mismatched surfaces.

Referring to FIGS. 3 and 3a, a process in accordance with a first embodiment involves passing a first cylindrically shaped tool or quill 30 along the Y axis that is parallel to the axis of rotation of the disc 20. Quill 30 includes a distal end 31 with a recessed portion 32 defined therein. The purpose of the recessed portion 32 is to avoid a so-called zero speed point, that is the portion of the quill on the axis of rotation to be in contact with the bottom surface 28 of the slot being milled. The path of quill 30 provides a rough cut through the slot 23 to be formed.

Referring to FIG. 4, a first finishing quill 38 having a tip 35 shaped to the exact finished profile of the right sidewall 24 of the slot 23 is passed along the Y axis, inclined as shown in FIG. 4. The right hand wall 24 is thus formed. The quill 34 includes a proximal end 38 with a shaft 38A to be mounted to the milling machine. The quill 34 includes a distal end 40 which is roughly shaped to the bottom of the slot 23 and includes a recessed portion 41 provided to avoid a zero speed contact at the central portion of the distal surface 40.

Figure 5:
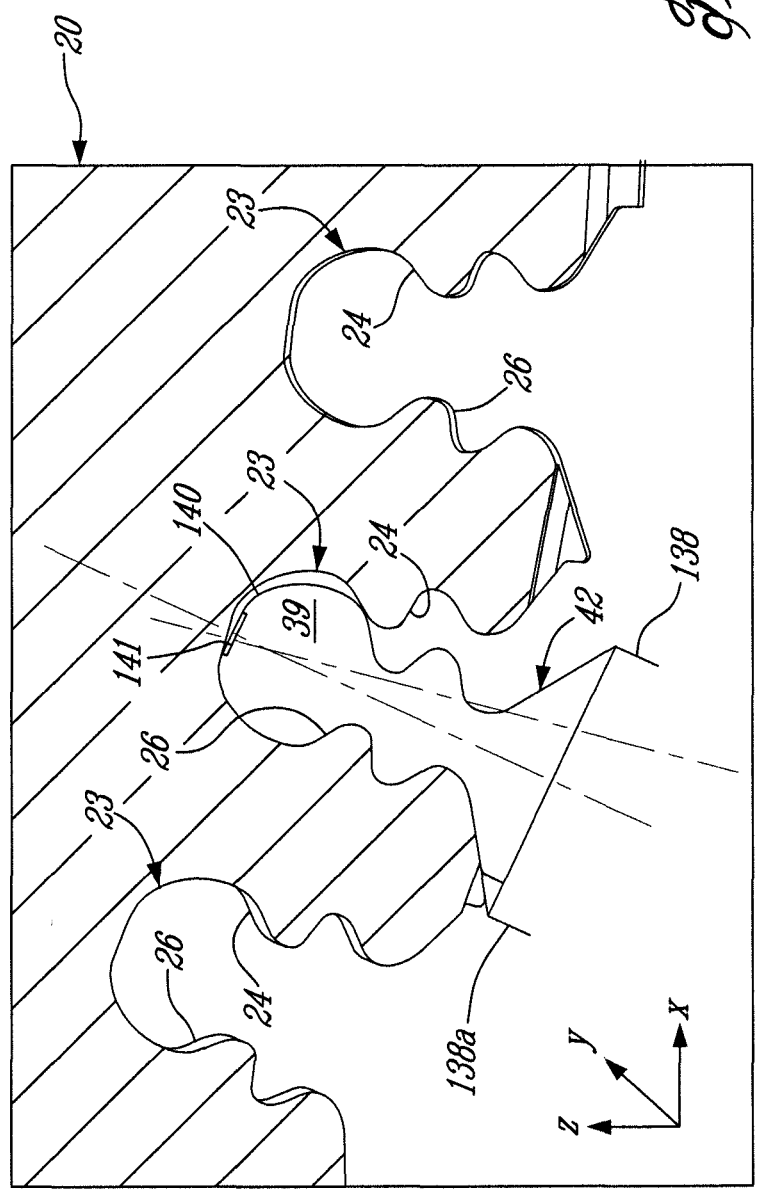
FIG. 5 is an enlarged fragmentary schematic view similar to FIG. 4 with another tool being used.

Referring now to FIG. 5 a quill 42 is then passed through the slot along the Y axis, but in this case the quill 42 is inclined towards the left hand wall 26. The shape of the tip 39 of the quill 42 is preferably identical to the finished profile of the left hand wall 26. The quill 42 includes a proximal end 138 with a shaft 138A. The tip 39 includes a distal surface 140 with a recessed portion 141, similar to the recessed portion 41 defined on quill 38.

Once the quills 38 and 42 have made their finishing passes forming the profile of the firtree slot 23, there tends to be a ridge P left a the bottom of the slot 23, however the ridge P is significantly smaller than with prior art approaches. Although, depending on its size, the ridge P may be left as is on the final disc, optionally a further machining pass may be made with a quill 44 as shown in FIGS. 6 and 7. Quill 44 is provided to further finish the bottom 28 of the slot 23 to remove the ridge P. The quill 44 includes a small diameter shaft 46 with a larger tip 48 adapted to navigate within the rounded bottom of the slot 23. The tip 48 may have a finishing, transverse distal surface 50 adapted to the particular slot being formed; in this case a somewhat frusto-conical shape is selected for the distal surface 50 interrupted by a recessed portion 52. The recessed portion 52 is also provided to avoid the zero speed contact with the finished surface.

Accordingly, a finished firtree slot is formed by passing four different tools in the Y axis. The first tool 30 provides a rough channel from which the firtree slot 23 will be formed. A right hand quill 34 is then passed to form the right hand wall, and then a left hand quill 42 is passed to form the left hand wall. The final pass is made with quill 44 to remove any excess ridge at the bottom of the slot 23.

The above description is meant to be exemplary only, and one skilled in the art will recognize that changes may be made to the embodiments described without departing from the scope of the invention disclosed. For example, the process could be used for other types of turbine machines. Still other modifications which fall within the scope of the present invention will be apparent to those skilled in the art, in light of a review of this disclosure, and such modifications are intended to fall within the appended claims.

We claim:

1. A tool for use in the formation of a firtree slot in a disc of a bladed disc assembly in a turbine engine, the firtree slot having two opposed sides defining a profile of the firtree slot, the tool comprising: a tip portion rotatable about an axis of rotation and having lateral side surfaces with a shape matching the profile of sides of the firtree slot to be formed, the tool being smaller than the profile of the formed firtree slot so that the tool will only engage one of said sides of the firtree slot at a time, the tip portion having an axial distal finishing surface transverse to the axis of rotation which extends centrally therethrough, the axial distal finishing surface including an annular frusto-conical surface portion surrounding a recessed portion centrally disposed within the axial distal finishing surface, the annular frusto-conical surface removing excess ridges formed in the bottom of the firtree slot, an entirely of the axial distal finishing surface remaining within the firtree slot during rotating about the axis of rotation, the axial distal finishing surface in operation contacting a bottom of the firtree slot, the recessed portion of the axial distal finishing surface being spaced apart from the bottom of the firtree slot during rotation of the tool while the axial distal finishing surface is in contact with the bottom of the firtree slot, in order to avoid a zero speed contact point between the tool and the disc during rotating operation of the tool.

2. The tool as defined in claim 1, wherein the tool is a super-abrasive milling quill.

3. The tool as defined in claim 1, wherein the axial distal finishing surface is substantially perpendicular to said axis of rotation.

\* \* \* \* \*